United States Patent
Svendsen

(10) Patent No.: US 9,146,677 B2
(45) Date of Patent: Sep. 29, 2015

(54) SYSTEMS AND METHODS FOR QUEUE REQUEST ORDERING WITHOUT STALLING REQUESTS IN ALIASING CONDITIONS BY USING A HASH INDEXED BASED TABLE

(71) Applicant: Applied Micro Circuits Corporation, Sunnyvale, CA (US)

(72) Inventor: Kjeld Svendsen, Sunnyvale, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 0 days.

(21) Appl. No.: 13/752,161

(22) Filed: Jan. 28, 2013

(65) Prior Publication Data

US 2014/0215181 A1    Jul. 31, 2014

(51) Int. Cl.
G06F 12/10    (2006.01)
G06F 3/06    (2006.01)

(52) U.S. Cl.
CPC .............. *G06F 3/06* (2013.01); *G06F 12/1018* (2013.01)

(58) Field of Classification Search
CPC ........ G06F 3/06; G06F 12/1018; G06F 12/10
USPC ................ 710/39, 52, 68; 370/235, 392, 292; 712/225; 711/170
See application file for complete search history.

(56) References Cited

U.S. PATENT DOCUMENTS

| | | | |
|---|---|---|---|
| 7,072,342 B1 * | 7/2006 | Elnathan ...................... | 370/394 |
| 8,059,543 B2 * | 11/2011 | Ferguson et al. ............. | 370/235 |
| 8,407,707 B2 * | 3/2013 | Sonnier et al. ................ | 718/101 |
| 8,826,257 B2 * | 9/2014 | Al-Otoom et al. ............ | 717/161 |
| 2009/0013108 A1 | 1/2009 | Rajamani | |
| 2009/0327596 A1 | 12/2009 | Christenson et al. | |
| 2010/0179954 A1 * | 7/2010 | Chen et al. ..................... | 707/747 |
| 2010/0293353 A1 * | 11/2010 | Sonnier et al. ................ | 711/170 |
| 2013/0262838 A1 * | 10/2013 | Al-Otoom et al. ............ | 712/225 |
| 2013/0290573 A1 * | 10/2013 | Sherlock et al. ................ | 710/52 |
| 2014/0160935 A1 * | 6/2014 | Zecharia et al. .............. | 370/235 |

OTHER PUBLICATIONS

"Substituting Associative Load Queue with Simple Hash Tables in Out-of-Order Microprocessors," Alok Garg et al., pp. 268-273, 2006; IEEE Xplore.*
DDRn Memory Interface IP, http://www.synopsys.com/IP/InterfaceIP/DDRn/Pages/default.aspx.
U.S. Appl. No. 13/644,924, filed Oct. 4, 2012 Titled: Managing Banks in a Memory System; pp. 1-44.
U.S. Appl. No. 13/644,935, filed Oct. 4, 2012 Titled: Managing Banks in a Memory System; pp. 1-41.

* cited by examiner

*Primary Examiner* — Tammara Peyton
(74) *Attorney, Agent, or Firm* — Amin, Turocy & Watson, LLP

(57) ABSTRACT

The described systems and methods can facilitate efficient and effective information storage. In one embodiment a system includes a hash component, a queue request order component and a request queue component. The hash component is operable to hash a request indication. The queue request order component is operable to track a queue request order. The request queue component is operable to queue and forward requests in accordance with direction from the queue request order component. In one embodiment, the storage component maintains a request without stalling a request in an aliasing condition.

12 Claims, 12 Drawing Sheets

400

410
Performing an address indication compression process.

420
Performing a request order tracking process.

430
Performing a request queuing process.

FIG 4

SYSTEMS AND METHODS FOR QUEUE REQUEST ORDERING WITHOUT STALLING REQUESTS IN ALIASING CONDITIONS BY USING A HASH INDEXED BASED TABLE

RELATED APPLICATIONS

This application is related to application Ser. No. 13/644,924 entitled "Managing banks in a memory system", filed Oct. 4, 2012 and application Ser. No. 13/644,935 "Managing banks in a memory system" filed Oct. 4, 2012.

FIELD OF THE INVENTION

The present invention relates to storage operations. More particularly the present invention relates to a system and method for facilitating enhanced queue request ordering management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. The systems typically involve information storage and processing. However, traditional attempts at economically handling these operations can be subject to undesirable delays.

Some traditional approaches to information storage attempt to reduce costs and speed up process by hashing request addresses. However, hashing request addresses often results in multiple addresses having the same hash indictor. This phenomena is often referred to as aliasing. Aliasing can lead to inaccurate results. The inaccurate results can result in out of order complications. Conventional request processing attempts typically attempt to deal with aliasing or different address requests directed to the same hash by stalling. Stalling can often adversely impact overall system performance and end use experience.

SUMMARY

The described systems and methods can facilitate efficient and effective information storage. In one embodiment, a system includes a hash component, a queue request order component and a request queue component. The hash component is operable to hash a request indication. The queue request order component is operable to track a queue request order. In one embodiment, a queue request order component includes an incrementor that increments a request count associated with received requests (e.g., a request received by the hash component and forwarded to the queue request order component, etc.); and a decrementor that decrements the request count associated with issued requests (e.g. a request issued by the request queue component, etc.). The count, hash and the request are forwarded to the request queue component. The request queue component is operable to queue and forward requests in accordance with direction from the queue request order component. In one embodiment, the request queue component only issues a request if the corresponding count is zero. The request queue also decrements the count of other queue elements with the same hash index on issue. In one embodiment, the storage component maintains a queue request order without stalling requests in aliasing conditions.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 4 is a block diagram of exemplary method in accordance with one embodiment of the present invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The described systems and methods can facilitate efficient handling of requests. In embodiment, the systems and methods utilize request tracking to facilitate enhanced request queue management. In one exemplary implementation, at least a portion of a request indication is compressed (e.g., hashed, etc.) and enhanced request tracking is utilized to reduce issues associated with the compression so that overall average performance is increased. A hash value corresponding to a request indication can be utilized as an index in various components enabling the operations to be performed faster than utilizing an original full size request indication (e.g., address, etc.) while a request hash order tracking scheme can facilitate reduction or minimization of adverse impacts (e.g., aliasing, stalling, etc.) otherwise encountered when simply just hashing a request indicator. In one exemplary implementation, the systems and methods maintain a queue request order while enabling more continuous filling of a request queue with minimal or no stalling of request queuing processes even when an aliasing request occurs.

Figure 1:
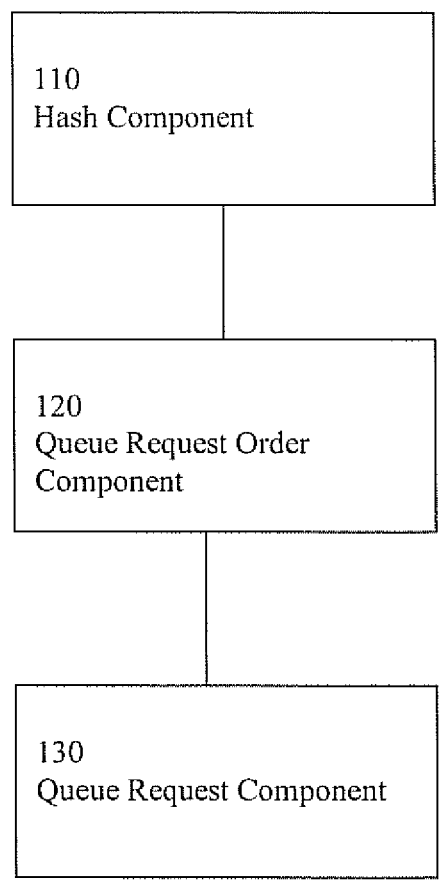
FIG. 1 is a block diagram of an exemplary system in accordance with one embodiment of the present invention.

FIG. 1 is a block diagram of an exemplary system 100 in accordance with one embodiment of the present invention. System 100 includes a hash component 110, a queue request order component 120 and a request queue component 130. Hash component 110 is coupled to queue request order component 120 which is coupled to request queue component 130.

The components of system 100 cooperatively operate to perform efficient information storage. Hash component 110 is operable to hash aspects of a request indication (e.g., address, portion of an address, etc.). Queue request order component 120 is operable to track requests to enhance continuous filling of request queue component 130. Request queue component 130 is operable to queue and issue requests in accordance with direction from the queue request order component. It is appreciated that queue request order component 120 and request queue component 130 can be implemented in a variety of configurations. In one embodiment, a request count is utilized wherein the request count corresponds to the number of received requests minus issued requests that correspond to a hash of a request. In one exemplary implementation, the queue request order component 120 includes a plurality registers operable to store a count and a count adjustment component operable to adjust the count.

Figure 2:
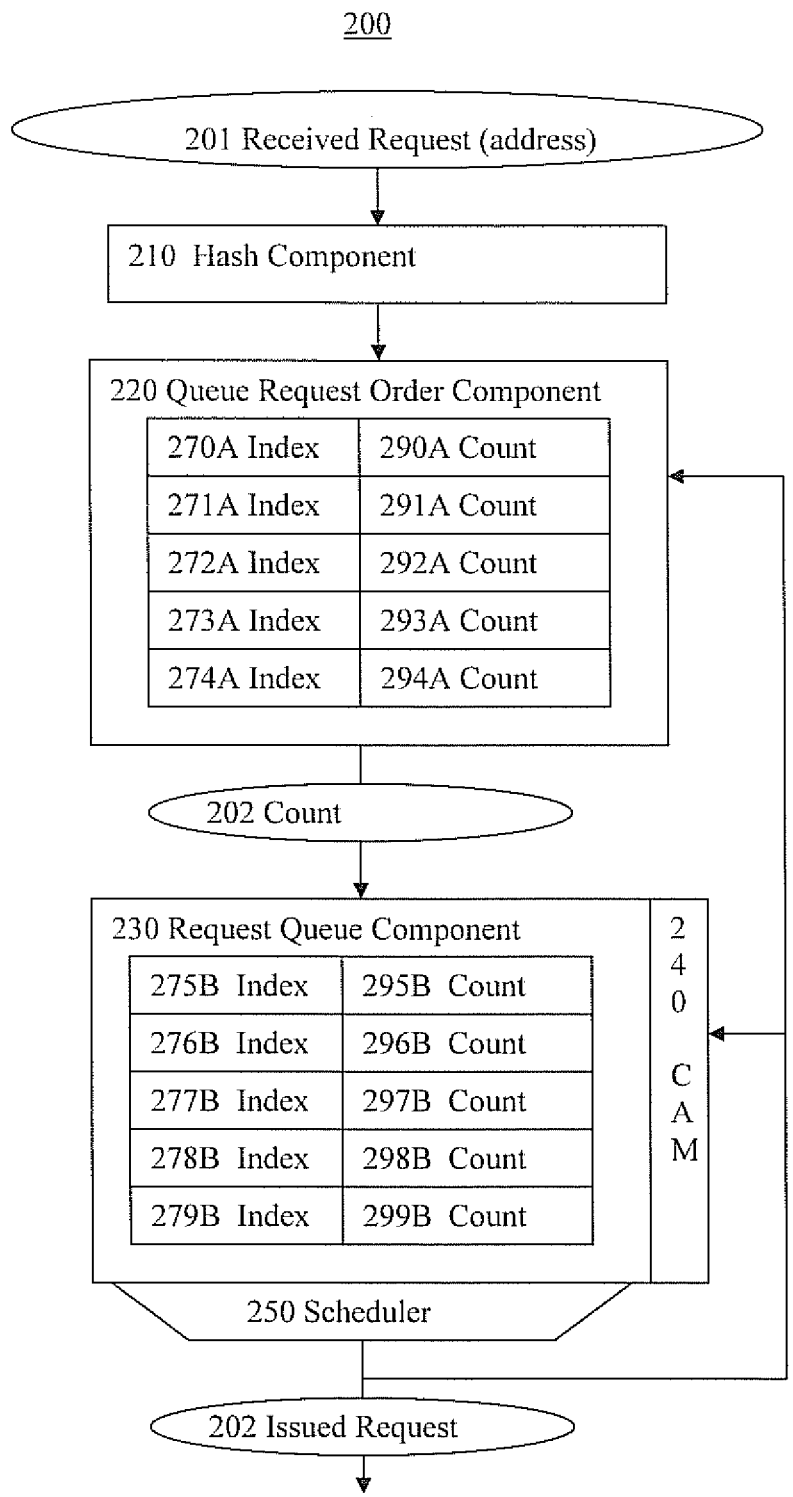
FIG. 2 is a block diagram of an exemplary system in accordance with one embodiment of the present invention.

FIG. 2 is a block diagram of an exemplary system 200 in accordance with one embodiment of the present invention. In one embodiment, system 200 is similar to system 100. System 200 includes a hash component 210, a queue request order component 220 and a request queue component 230. Hash component 210 is coupled to queue request order component 220 which is coupled to request queue component 230. Hash component 210 is operable to hash a request indication. Queue request order component 220 is operable to track a queue request order. Request queue component 230 is operable to queue and forward requests in accordance with direction from the queue request order component. In one embodiment, request queue component 230 can include content addressable memory (CAM) 240 and scheduler 250.

The components of system 200 cooperatively operate to order requests. When a request 201 including an address is received the address is hashed by hash component 210. The results of the hashing are forwarded to queue request order component 220 and used as a looked up to find the count value associated with the hash of the request address.

In one embodiment, the queue request order component 220 performs a request receipt count incrementation process and a request issue count derementation process. The request receipt count incrementation process increments a count associated with a hash corresponding to a received request. The count value is read from the queue request order component 220 and is attached to the request along with the hash value and forwarded to the request queue component 230. This information including the selected count value 202 is forwarded to and entered in the request queue component 230. The count value in the queue request order component 220 is incremented. The request issue count decrementation process decrements a count associated with a hash corresponding to an issued request. When a request is issued from or processed by the request queue component 230 the count in request queue component 230 is decremented and the hash value of the request is fed back to thru the CAM 240 to the request component 230 where each entry checks it's hash value against the hash value of the issued request. If the request values match the count of the corresponding entry the count is decremented. In one embodiment, a request in the request queue component 230 can only issue if it's count value is zero.

In one embodiment, a request order component (e.g., 120, 220, etc.) includes a queue request ordering table or Request Ordering Table (ROT). The each table entry of the request ordering table is indexed with a hash of the request address and each table entry includes a count of the number of requests to a hash corresponding to the index. In one exemplary implementation, the count is called the ROTC. The request count can correspond to a queue request order or sequence. In one exemplary implementation, the results of the hashing can be called the ROTID. The size of the ROT can depend upon the size of the ROTID.

In one embodiment, the ROT is indexed with a hash of the 36 most significant bits (msbs) of a 42 bit address. In one exemplary implementation, the hashing produces a value of 5 to 8 bits long. In one embodiment, a hash used for a MCU select can also be used for the ROTID since the upper 36 address bits are used for both. In one exemplary implementation, a hash is used that renders 1 bit for the MCU select and 5-8 bits for the ROTID (6-9 bits). In one embodiment, a queue depth times the ROTID size CAM (e.g., with approximately 6 bits, etc.) is also used. In one exemplary implementation, the a request order table (ROT) has a range of approximately 64 entries and is considered relatively cheap.

It is appreciated that the queue request ordering systems and methods can be implemented in relatively cheap configurations. The configurations can be cheap or small in terms of area and fast in timing (e.g., versus a fill size CAM, etc.). In one embodiment, the "cost" of implementing a ROT is a 2R/2W approximately 64 by 6 bits flop-based memory and two in/decrementors and an approximate 64 by 6 bit CAM.

It is appreciated that hashing at least a portion of the request address and forwarding the hash results to other various operations (e.g., request tracking, request queuing, etc.) enables various other operations to be performed quicker than utilizing the full request address. In one embodiment, utilizing the hash values as indexes in various components enables the operations to be performed faster than utilizing the original full values. In one exemplary implementation, a variety of comparison operations are performed faster when a hashed value is utilized as an comparison input versus comparison operations in which a full value is utilized as a comparison input.

It is also appreciated that utilizing a request hash order tracking scheme facilitates reduction or minimization of adverse impacts (e.g., aliasing, stalling, etc.) otherwise encountered when simply just hashing a number. The hash order tracking scheme enables a system to continue to fill up a request queue even when a aliasing or other condition may occur that would otherwise result in a stall in a conventional system. The ability to efficiently deal with adverse affects of hashing that would otherwise occur in conventional systems attempting to utilize hashing enables even smaller size hash values to be utilized which facilitates faster operations (e.g., compare, etc.). In one embodiment, R-W, W-W and W-R ordering is critical and R-R ordering may be over constrained.

It is appreciated that a variety of different logic components can be utilized to implement the queue request ordering systems and methods. In one embodiment, the components can be built using random logic.

Figure 3:
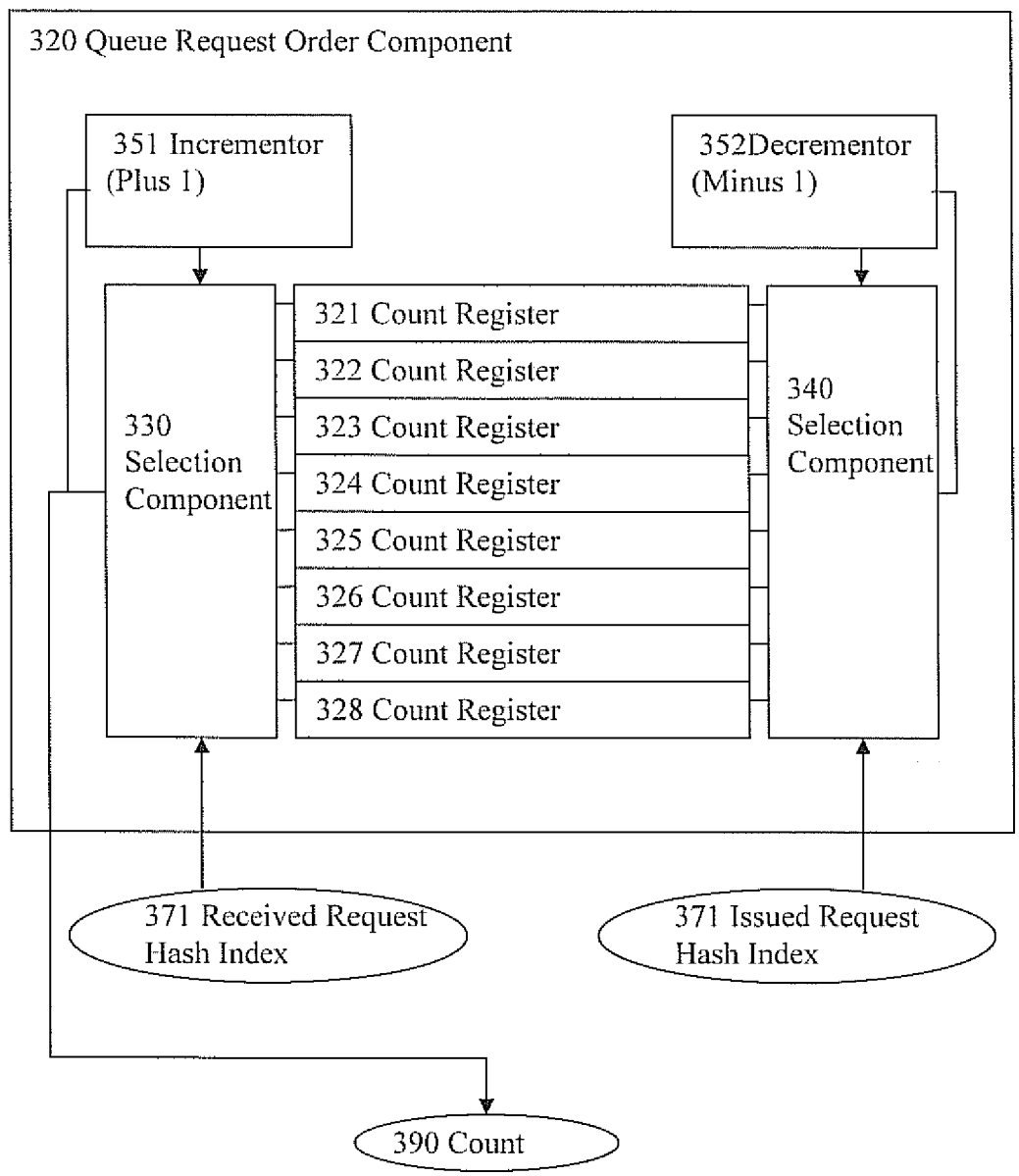
FIG. 3 is a block diagram of an exemplary queue request order component in accordance with one embodiment of the present invention.

FIG. 3 is a block diagram of an exemplary queue request order component 300 in accordance with one embodiment of the present invention. In one embodiment, queue request order component 300 is similar to queue request order component 220. Queue request order component 300 includes incrementor 351, decrementor 352, selection component 330, count registers 321, 322, 323, 324, 325, 326, 327 and 328, selection component 340. Count registers 321, 322, 323, 324, 325, 326, 327 and 328 track count values corresponding to a hash index. The components of queue request order component 300 cooperatively operate to track request counts. In one embodiment, queue request order component 300 performs a count increment and a count decrement based upon respective receipt and issue of a request indication.

In one embodiment, a count increment is performed in response to receipt of a hash index associated with a request indication. A hash index 371 associated with an incoming request is received and utilized by selection component 330 to select one of the corresponding count registers 321 through 328. The count value is retrieved from the corresponding count register and forwarded to incrementor 351 and also as count 390 to a request queue (e.g., 130, 230, etc.). Incrementor 351 increments the count by a value of 1 and returns the increased count to selection component 330 which forwards the incremented count to the appropriate corresponding count register 321 though 328. The selection component 330 can include an input multiplexer operable to receive request inputs and select between the request inputs; wherein inputs of the plurality of registers are coupled to respective outputs of the input multiplexer. The selection component 340 can include an output multiplexer operable to receive outputs from the request inputs and select between the request inputs.

With reference still to FIG. 3, in one embodiment a count decrement is performed in response to receipt of a hash index associated with a request indication. A hash index 372 associated with an incoming issue indication is received and utilized by selection component 340 to select one of the corresponding count registers 321 through 328. The count value is retrieved from the corresponding count register and forwarded to decrementor 352. Decrementor 352 decrements the count by a value of 1 and returns the decreased count to selection component 340 which forwards the decremented count to the appropriate corresponding count register 321 though 328.

Figure 5:
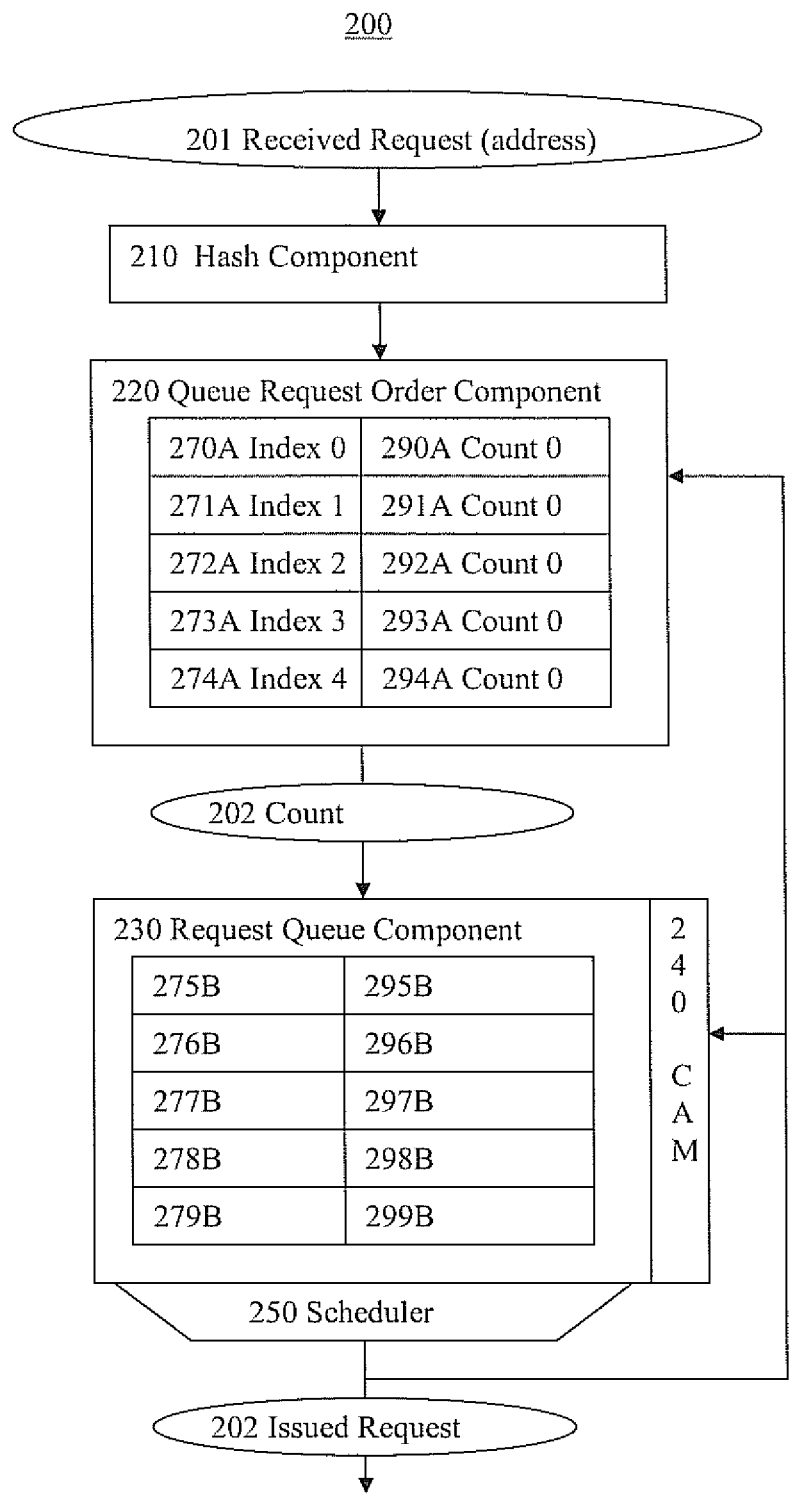
FIG. 5 is a block diagram of an exemplary system in an initial state in accordance with one embodiment of the present invention.

FIG. 5 is a block diagram of system 200 in an initial state in accordance with one embodiment of the present invention. In one embodiment, queue request order component 220 includes index slots 270A through 274A and count slots 290A through 294A. Index slots 270A through 274A have index values of 0 through 4 respectively and corresponding count slots 290A through 294A have count values of zero. In one embodiment, request queue component 230 includes index slots 275B through 279B and count slots 295B through 299B. Initially no requests are received yet and count slots 295B through 299B have a value of zero.

Figure 6:
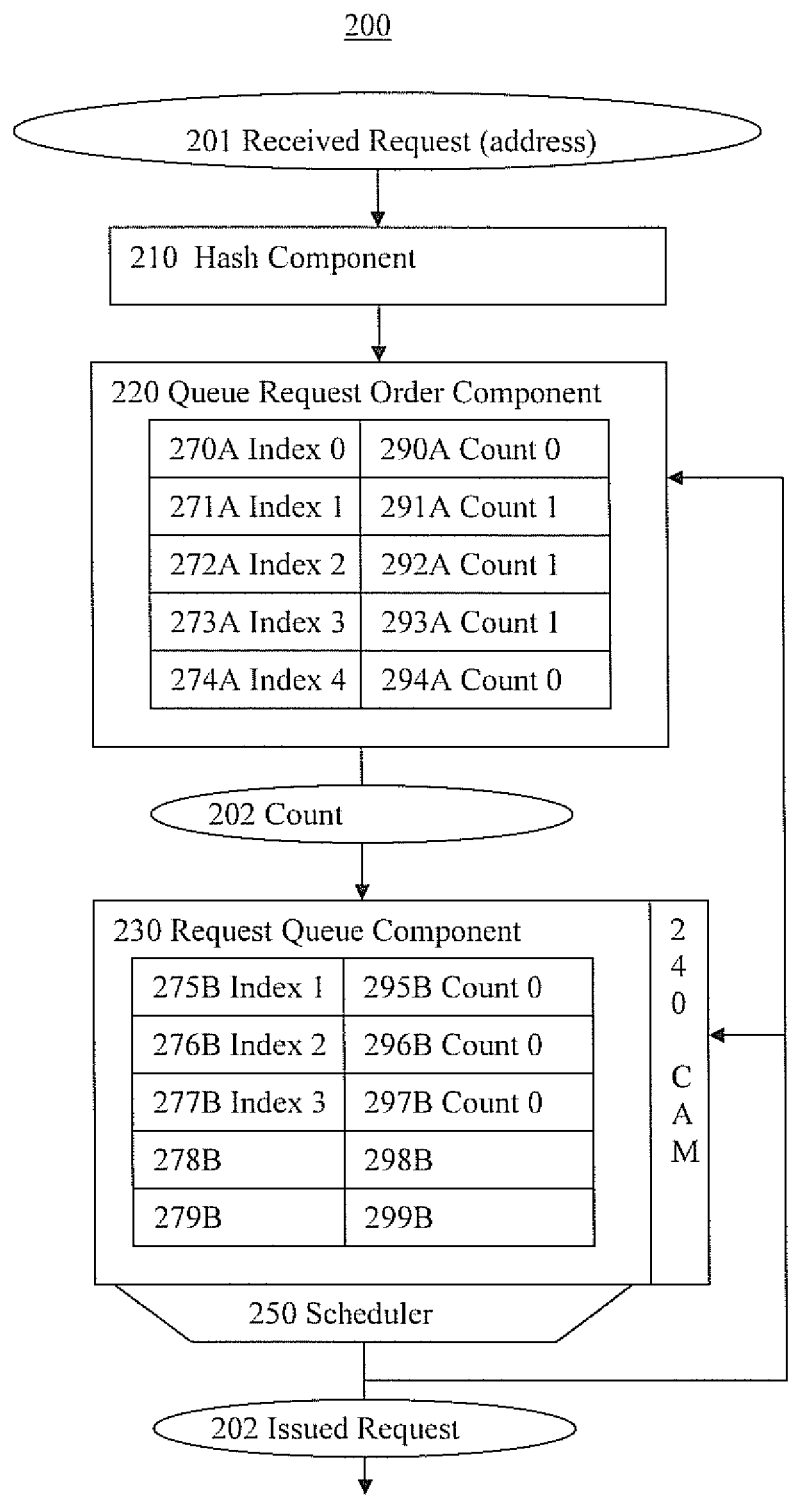
FIG. 6 is a block diagram of an exemplary system after requests are received in accordance with one embodiment of the present invention.

FIG. 6 is a block diagram of system 200 after requests are received in accordance with one embodiment of the present invention. In one embodiment, three requests (e.g., similar to request 201, etc.) are received by hash component 210. A first request is directed to an address that hash component 210 hashes to a hash value of 1 and forwards the information to queue request order component 220. The queue request order component 220 correlates the received hash value of 1 to the index value of 1 in slot 271A and forwards the corresponding count value of 0 in slot 291A (see initial count of 0 show in FIG. 5) along with the request and hash value of 1 to the request queue component 230. Queue request order component 220 increments the count value of 0 to 1 and returns the incremented count value of 1 to the count slot 291A associated with index 271A hash value 1. Request queue component 230 tracks the received request and hash index value of 1 in slot 275B and the corresponding count value of 0 in count slot 295B.

Similarly, the second request is directed to an address that hash component 210 hashes to a hash value of 3 and forwards the information to request order queue component 220. The queue request order component 220 correlates the received hash value of 3 to the index value of 3 in slot 273A and forwards the corresponding count value of 0 (see initial count of 0 show in FIG. 5) along with the request and hash value of 3 to the request queue component 230. Queue request order component 220 increments the count value of 0 from count slot 293A to 1 and returns the incremented value of 1 to the count slot 293A associated with index 273A hash value 3. Request queue component 230 tracks the received request and hash index value of 3 in slot 276B and the corresponding count value of 0 in count slot 295B.

The third request is directed to an address that hash component 210 hashes to a hash value of 2 and forwards the information to queue request order component 220. The queue request order component 220 correlates the received hash value of 2 to the index value 2 in slot 272A and forwards the corresponding count value of 0 in slot 292A (see initial count of 0 show in FIG. 5) along with the request and hash value of 2 to the request queue component 230. Queue request order component 220 increments the count value of 0 from count slot 292A to 1 and returns the incremented value of 1 to the count slot 292A associated with index 272A hash value 2. Request queue component 230 tracks the received request and hash index value of 1 in slot 277B and the corresponding count value of 0 in count slot 297B.

Figure 7:
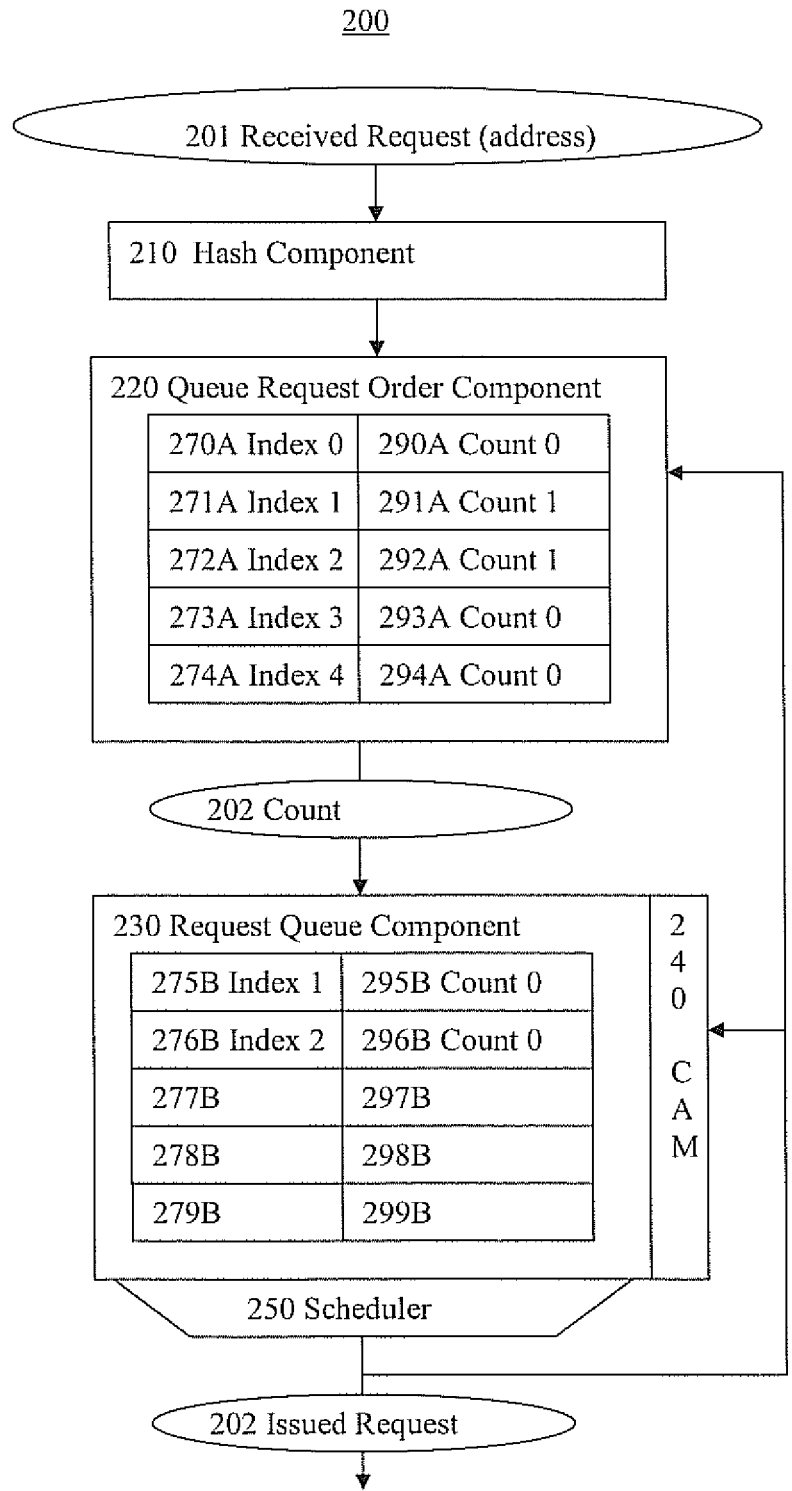
FIG. 7 is a block diagram of an exemplary system after a request is issued in accordance with one embodiment of the present invention.

FIG. 7 is a block diagram of system 200 after a request is issued in accordance with one embodiment of the present invention. In one embodiment, the count value of 0 in count slot 297B makes the corresponding request eligible for issue and a request associated with index 3 in slot 277B of request queue component 230 is issued. After issue of the request, the request queue component 230 identifies any remaining entries associated with the index value 3 in request queue component 230 and decrements the corresponding count value. Since the issued request was the only request in request queue component 230 that was associated with index value 3, after the request issues there is no requests and corresponding counts associated with index value 3 remaining in request queue component 230 to be decremented. After issue, request queue component 230 also notifies queue request order component 220 of the issued request associated with the index value 3. Upon receipt of the issue notification, queue request order component 220 indentifies count slots and counts corresponding to the request index value 3 and decrements the counts by 1. For example, the count value 293A associated with the index 273A corresponding to the index value of 3 is decremented from a count value of 1 resulting in the count slot 293A having a count value of 0. Since requests associated with hash values 1 and 2 have not been issued the counts 295B and 296B associated with indexes 275B and 276B remain unchanged. the counts in count slots 291A and 292A also remain unchanged.

Figure 8:
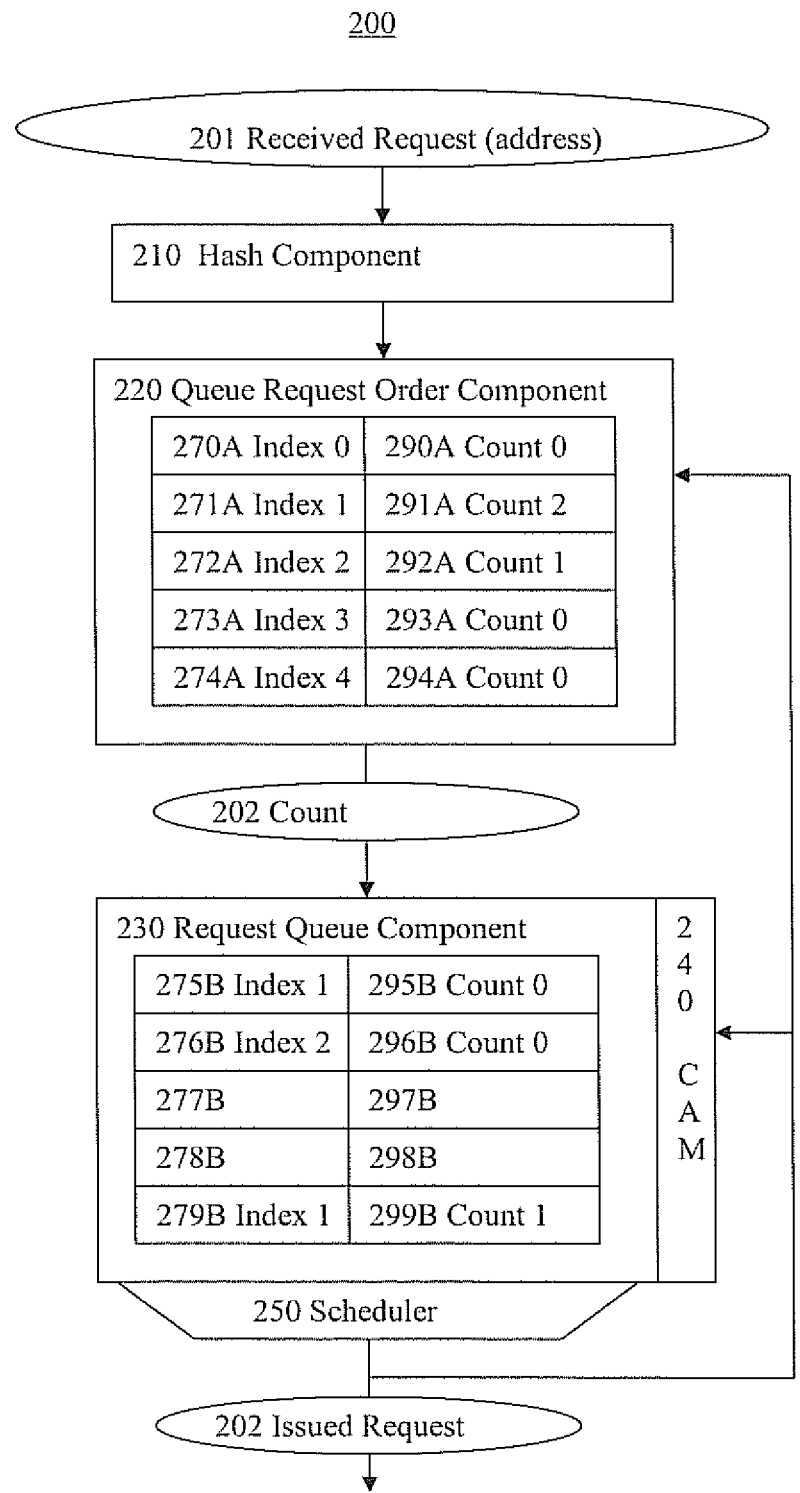
FIG. 8 is a block diagram of an exemplary system after another request is received in accordance with one embodiment of the present invention.

FIG. 8 is a block diagram of system 200 after another request associated with index 1 is received. The queue request order component 220 correlates the received hash value of 1 to the index slot 271A value of 1 and forwards the corresponding count value of 1 in slot 291A (see count of 1 show in FIG. 7) along with the request and hash value of 1 to the request queue component 230. Queue request order component 220 increments the count value of 1 from count slot 291A to 2 and returns the incremented value of 2 to the count slot 291A associated with index 271A hash value 1. Request queue component 230 tracks the received request in slot 279B with and index value of 1 and the corresponding count value of 0 in count slot 299B. As indicated in FIG. 8 there are now two requests in request queue component 230 associated with index value 1 and this count is reflected in the count value of 2 is count slot 291A of queue request order component 220.

Figure 9:
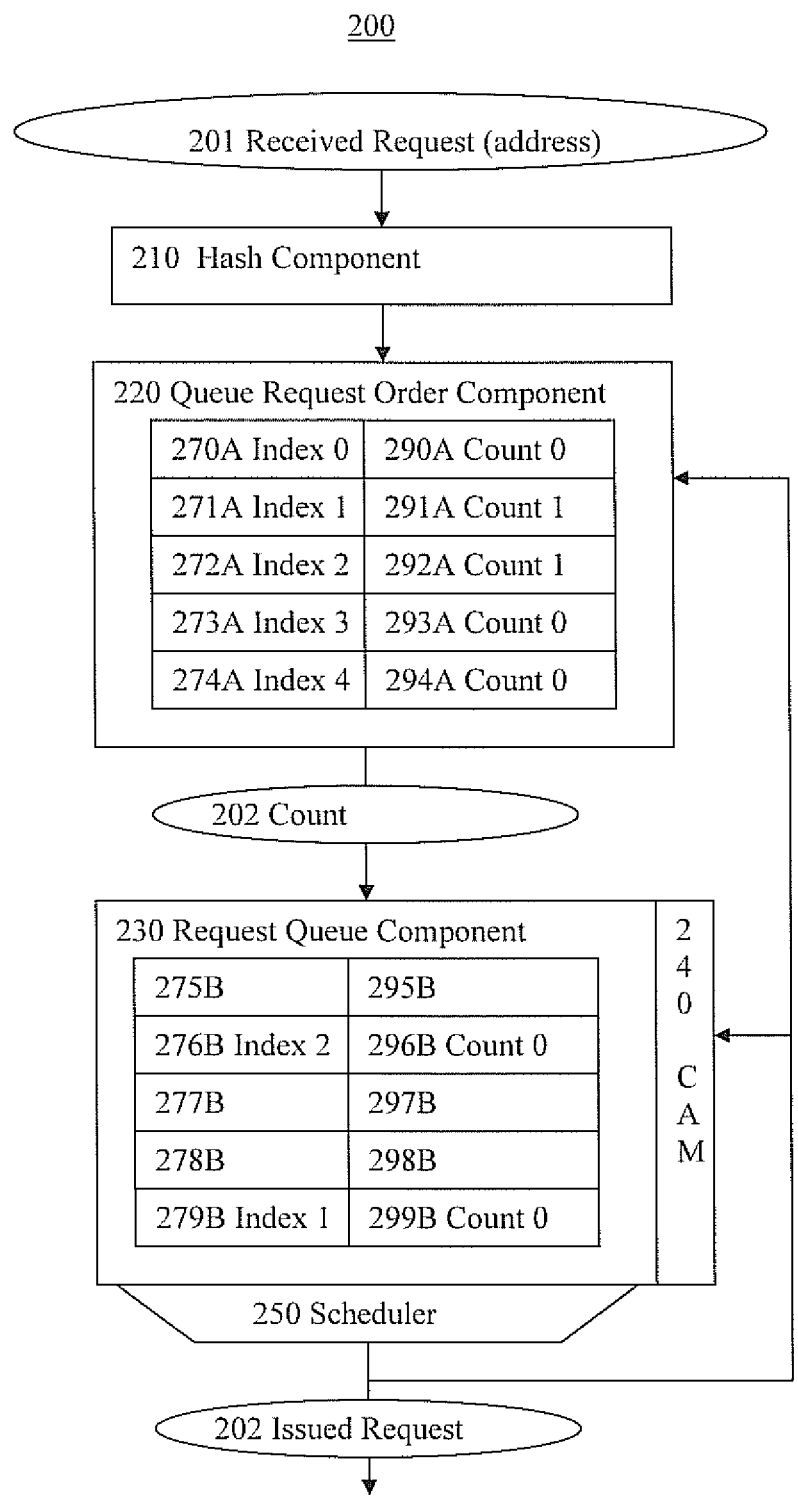
FIG. 9 is a block diagram of an exemplary system after another request is issued in accordance with one embodiment of the present invention.

FIG. 9 is a block diagram of system 200 after a request associated with index 1 is issued. In one embodiment, the count value of 0 in count slot 295B makes the corresponding request eligible for issue and a request associated with index 1 in slot 275B of request queue component 230 is issued. After issue of the request, the request queue component 230 identifies any remaining entries associated with the index value 1 in request queue component 230 and decrements the corresponding count value. Since there is another request associated with index value 1 (see slot 279B in FIG. 8) other than the issued request in slot 275B, the corresponding count of the remaining request queue component 230 (see count slot 299B value of 1 in FIG. 8) is decremented. The count value of 1 is retrieved from count slot 299 is decremented and the resulting count value of 0 is returned to count slot 299. After issue, request queue component 230 also notifies queue request order component 220 of the issued request associated with the index value 1. Upon receipt of the issue notification, queue request order component 220 indentifies count slots and counts corresponding to the request index value 1 and decrements the counts by 1. For example, the slot 271A has an index value of 1 and the corresponding count in slot 291A is decremented from a count value of 2 to 1 resulting in the count slot 291A having a count value of 1.

In one exemplary implementation summary of FIGS. 5 through 9, various requests are received and issued. The received requests include two requests associated with index 1. The request associated with index 1 received first is tracked in request queue component 230 by queue slot 275A and count values in corresponding count slot 295B based upon information from queue request order component 220. The request associated with index 1 received second is tracked by queue slot 279A and count values in corresponding count slot 299B, again based upon information from queue request order component 220. In one embodiment, the count values tracked and assigned by queue request order component 220 to the respective first and second requests associated with index value 1 ensure the queue request order of first and second is maintained for issuance. In one exemplary implementation, the request associated with index value 1 received second (e.g., request associated with slot 279B in FIG. 8) is not issued and remains in request queue component 230 (e.g., request associated with slot 279B in FIG. 9) until after the request associated with index value 1 received first (e.g., request associated with slot 275B in FIG. 6) is issued (e.g., request associated with slot 275B in FIG. 9).

FIG. 4 is a block diagram of exemplary method 400 in accordance with one embodiment of the present invention.

In block 410, an address indication compression process is performed. In one embodiment, an address indication compression process compresses the address indication. In one exemplary implementation, the address indication compression process includes hashing a received address.

In block 420 a queue request order tracking process is performed. In one embodiment, the queue request order tracking process tracks the order of received requests. In one exemplary implementation, the queue request order tracking process includes forming a queue request order table. The queue request order tracking process can include counting the number of requests to a hashed address. For example, the queue request order tracking process can include incrementing a count when a request is received and decrementing a count when an indication is received that indicates the request queuing process has processed a request.

In block 430 a request queuing process is performed. In one embodiment, the request queuing process is performed in accordance with the queue request order tracking process, wherein the queue request order tracking process maintains a queue request order without stalling the request queuing process even when an aliasing request occurs. In one exemplary implementation, the request queuing process includes forwarding an indication to the queue request order tracking process that the request queuing process has processed a request.

It is appreciated that a variety of different size hashes (e.g., number of bits in a hash, etc.) can be utilized. In one embodiment, the number of bits in a hash is based upon performance results. In one exemplary implementation, the number of bits in a hash is reduced until the overall performance begins to diminish. The number of bits in the hash can be reduced until the performance gains (e.g., faster time, increased output, etc.) from reducing the number of bits in the hash is outweighed by adverse performance associated with the reduced number of bits (e.g., reissue of requests due to aliasing, timing, etc.).

A present scheme can create false dependencies as address A and B being different can hash to the same has value (e.g., ROTID, etc.). The schemes can be evaluated for efficiency and the components (e.g., count registers, ROT, etc.) sized accordingly. In one embodiment, the number of bits in a hash can be varied based upon performance results. In one exemplary implementation, the number of bits in a hash is selected based upon performance. In general the smaller the hash size the faster the operations (e.g., compare, communicate, analyze, etc.) are performed and performance increases. It is appreciated that there can be a diminishing point of return or benefit to the number of bits in the hash. It is possible that as the hash size gets smaller there is an increase in various issues (e.g., aliasing, resend writes, etc.).

In one embodiment, the increase in various issues is application dependent. In one exemplary implementation, a hash index size (e.g., number of bits, etc.), queue request order component size (e.g., 120, 220, 320, etc.) and request queue component size (e.g., 130, 230, etc.) are configured so that false dependencies or aliasing occur less than 5% of requests. It is also appreciated that some applications may be more tolerant of false dependencies or aliasing and adequate performance is achievable with smaller hash value sizes. Some applications may be more critical or less tolerant of false dependencies or aliasing and can have smaller hash value sizes. In one embodiment, if performance is unacceptably impacted the hash index size and queue request order component size can be increased to improve performance.

Figure 10:
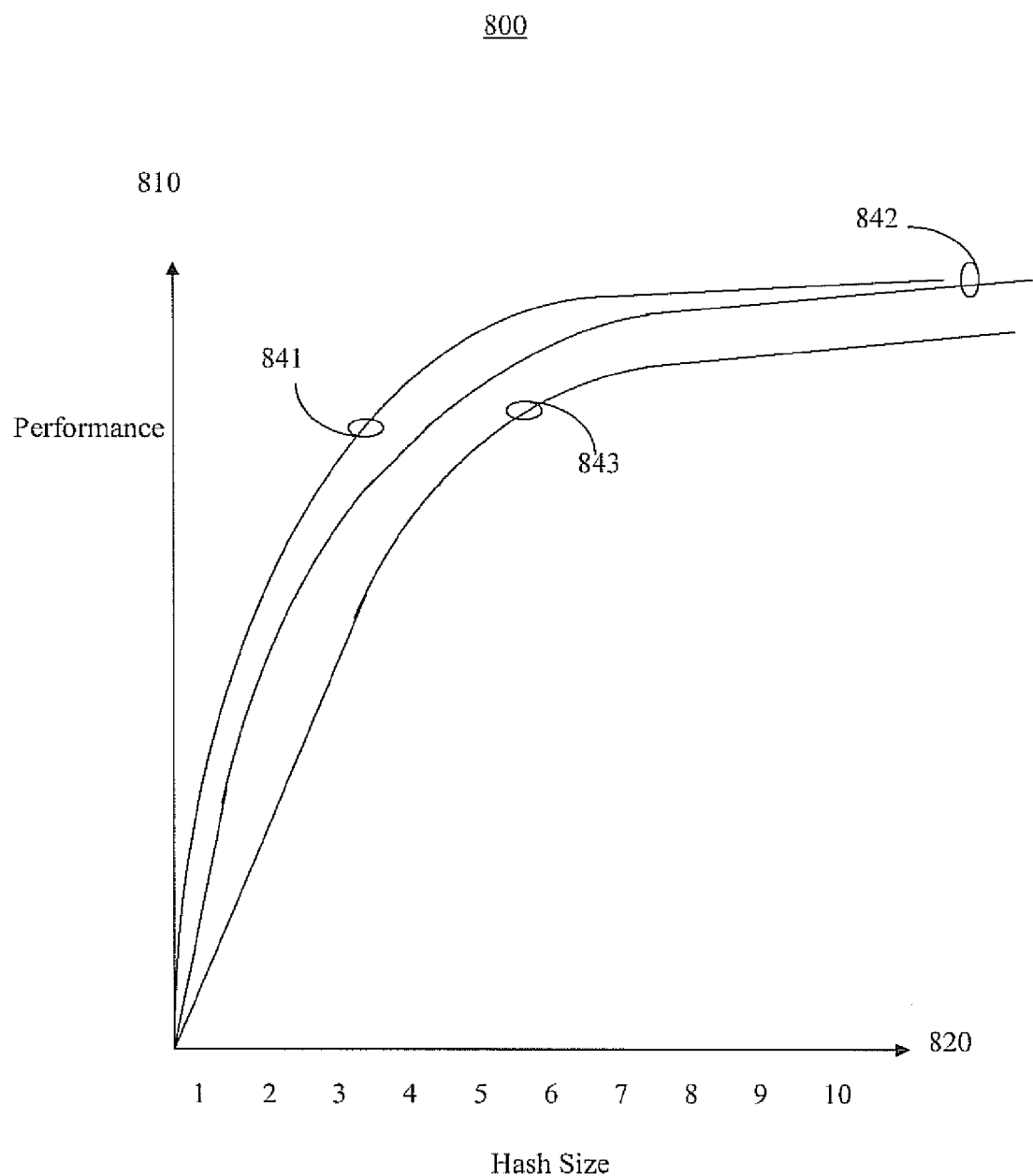
FIG. 10 is a block diagram of an exemplary graph of hash size versus performance in accordance with one embodiment of the present invention.

FIG. 10 is a block diagram of an exemplary graph of hash size versus performance in accordance with one embodiment of the present invention. The performance of various applications (e.g., 841, 842, 843, etc.) is mapped to graph 800 with performance on axis 810 and has size is presented on axis 820. In one embodiment, the hash size is measured in bits (e.g., bits 1 through 10, etc.). As illustrated in FIG. 8 there is a range after which the increases in performance versus has size becomes smaller. In one exemplary implementation, the hash size is selected in range (e.g., 6-8 bits, etc.) where the graph or increase performance benefit trajectory begin to become relatively flat.

In one embodiment, a system and method can handle a plurality of streams. The number of bits in a hash value and corresponding index sizes of a queue request order component (e.g., 120, 220, 320, etc.) and request queue component (e.g., 130, 230, etc.) determine the number of streams a system can handle. In one exemplary implementation, the number of bits in a hash value is 8 and the system can handle 8 separate streams. In one embodiment the scheduler can pick a stream.

In one embodiment, a system comprises a processing component for processing information and a storage component for storing information for the processor, wherein the storage component is responsive to requests from the processor to read and write the information, and wherein storage component maintains a queue request order without stalling requests in aliasing conditions; and a bus for communicating information between the processing component and the storage component. The processing component can be a processor and the storage component can be a memory. The storage component can be included in a processor chip. In one embodiment, the storage component includes a schedule tracking component and a buffer component. The schedule tracking component can be operable to track a schedule for handling a request. The buffer component can store requests and forward the request in accordance with the schedule for handling a request. In one embodiment, the schedule tracking component can include a request order table, and the buffer component includes a request queue. In one exemplary implementation, a count is incremented when a request is received and the count is decremented when a request is issued.

Figure 11:
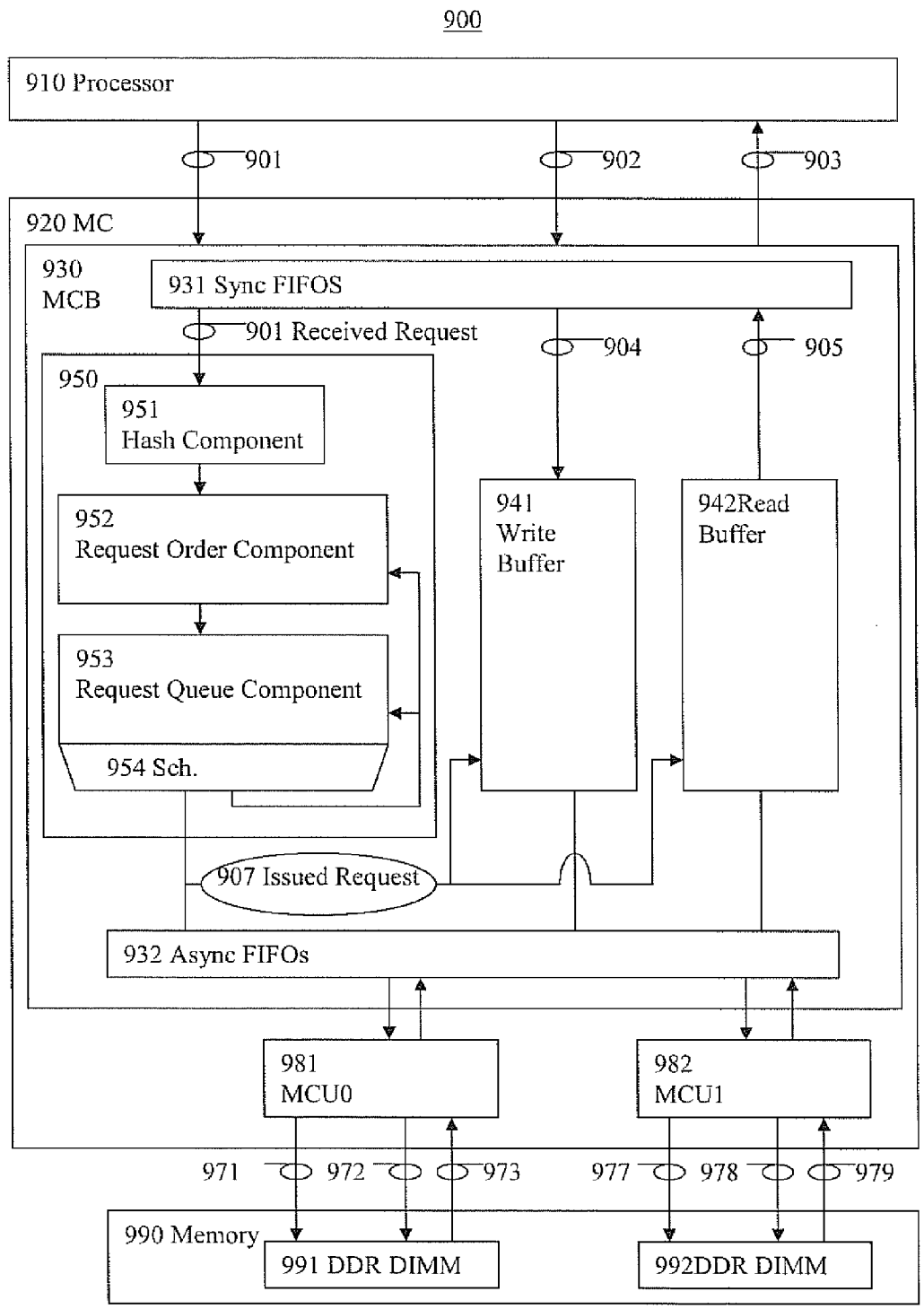
FIG. 11 is a block diagram of an exemplary memory system in accordance with one embodiment of the present invention.

FIG. 11 is a block diagram of a memory system 900 in accordance with one embodiment of the present invention. Memory system 900 includes processor 910, memory controller 920 and memory 990. Memory controller 920 includes memory control buffer (MCB) 930, memory control unit 981 and memory control unit 982. Memory control buffer (MCB) 930 includes sync FIFOs 931, Async FIFOs 932, queue tracking component 950, write buffer 941, and read buffer 942. Memory 990 includes DDR DIMM 991 and DDR DIMM 992.

The components of memory system 900 cooperatively operate to perform memory operations. Processor 910 issues requests 901, forwards out data 902 and receives read data 903. Memory control buffer 930 performs buffer operation including tracking request queue entries. Sync FIFOs 931 forwards the issues requests 901 to request handling component 950, forwards write data 904 to write buffer 941 and receives read data 905 from read buffer 942. Async FIFOs 932 receives the issues requests 907 from request handling component 950, receives write data from write buffer 941 and forwards read data to read buffer 942. MCU 981 forwards request data 971 and data 972 to DDR DIMM 991 and receives data 973 from DDR MIMM 991. MCU 982 forwards request data 977 and data 978 to DDR DIMM 991 and receives data 979 from DDR MIMM 991. Request handling component 950 performs request handling including queue request order tracking and queuing (e.g., similar to system 100 and system 200).

Request handling component 950 cooperatively operate to perform efficient request handling. Request handling component 950 includes hash component 951, queue request order component 952 request queue component 953 and scheduler 954. Hash component 951 hashes the requests (e.g., similar to hash 110, 120, etc.). Queue request order component 952 tracks requests (e.g., similar to queue request order component 120, 220, etc.). Request queue component 953 queues requests (e.g., similar to request queue component 130, 230, etc.) Scheduler 954 schedules request issues (e.g., similar to queue request order component 120, scheduler 250, etc.).

Figure 12:
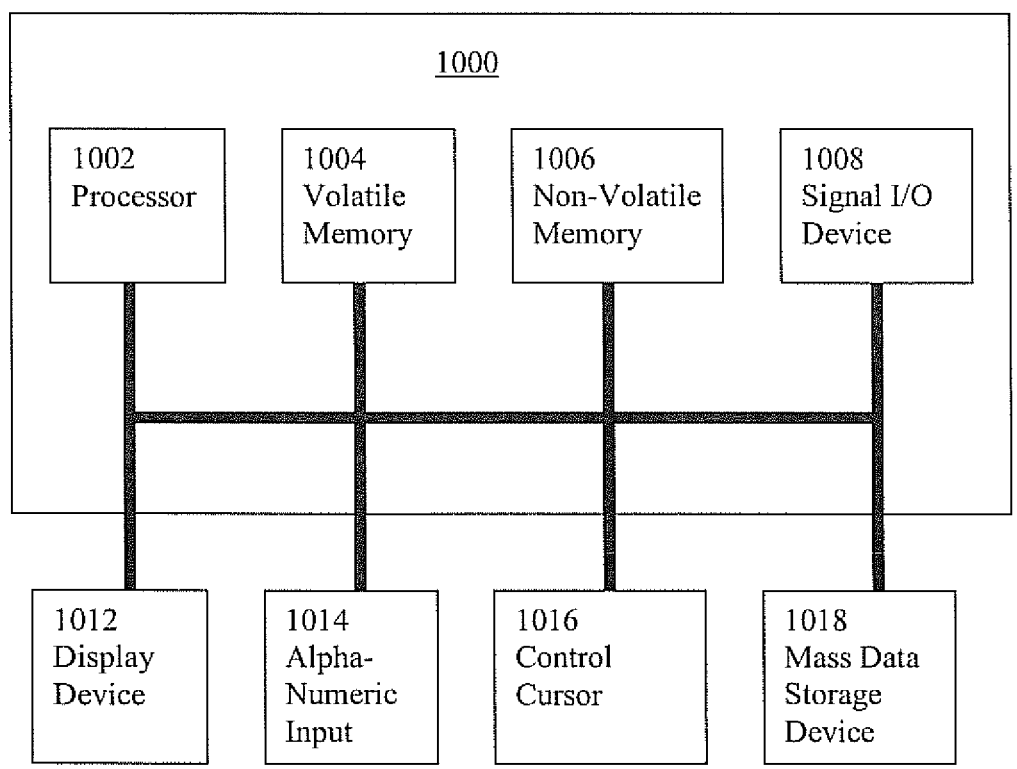
FIG. 12 is a block diagram of an exemplary computer system that can be used in accordance with embodiments of the present invention.

FIG. 12 is a block diagram of an exemplary computer system 1000 that can be used in accordance with embodiments of the present invention. It is understood that system 1000 is not strictly limited to be a computer system. As such, system 1000 of the present embodiment is well suited to be any type of computing device (e.g., server computer, desktop computer, laptop computer, portable computing device, database computer, and the like). Note that computer system 1000 can be utilize to implement any type of computing device mentioned herein with reference to embodiments in accordance with the invention. In its various implementations, system 1000 may not include all of the elements illustrated by FIG. 10, or system 1000 may include other elements not shown by FIG. 10. Within the discussions of embodiments in accordance with the invention herein, certain processes and operations were discussed that may be realized, in some embodiments, as a series of instructions (e.g., software program) that reside within computer readable memory of computer system 1000 and executed by a processor(s) of system 1000. When executed, the instructions can cause computer 1000 to perform specific operations and exhibit specific behavior which are described herein.

Computer system 1000 comprises an address/data bus 1010 for communicating information, one or more central processors 1002 coupled with bus 1010 for processing information and instructions. Central processor unit(s) 1002 may be a microprocessor or any other type of processor. The computer 1000 also includes data storage features such as computer usable volatile memory 1004, e.g., random access memory (RAM), static RAM, dynamic RAM, etc., coupled with bus 1010 for storing information and instructions for central processor(s) 1002, computer usable non-volatile memory 1006, e.g., read only memory (ROM), programmable ROM, flash memory, erasable programmable read only memory (EPROM), electrically erasable programmable read only memory (EEPROM), etc., coupled with bus 1010 for storing static information and instructions for processor(s) 1002.

System 1000 of FIG. 10 also includes one or more signal generating and receiving devices 1008 coupled with bus 1010 for enabling system 1000 to interface with other electronic devices. The communication interface(s) 1008 of the present embodiment can include one or more wired and/or wireless communication technologies. For example, in one embodiment of the present invention, the communication interface 1008 is a serial communication port, but could also alternatively be any of a number of well known communication standards and protocols, e.g., a Universal Serial Bus (USB), an Ethernet adapter, a FireWire (IEEE 13114) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case, the communication interface(s) 408 may include a cable modem or a DSL modem.

Optionally, computer system 1000 can include an alphanumeric input device 1014 including alphanumeric and function keys coupled to the bus 1010 for communicating information and command selections to the central processor(s) 1002. The computer 1000 can also include an optional cursor control or cursor directing device 1016 coupled to the bus 1010 for communicating user input information and command selections to the processor(s) 1002. The cursor directing device 1016 can be implemented using a number of well known devices such as, but not limited to, a mouse, a track ball, a track pad, an optical tracking device, a touch screen, etc. Alternatively, it is appreciated that a cursor can be directed and/or activated via input from the alphanumeric input device 1014 using special keys and key sequence commands. The present embodiment is also well suited to directing a cursor by other means such as, for example, voice commands.

The system 1000 of FIG. 10 can also include an optional computer usable mass data storage device 1018 such as a magnetic or optical disk and disk drive (e.g., hard drive or floppy diskette) coupled with bus 1010 for storing information and instructions. An optional display device 1012 is coupled to bus 1010 of system 1000 for displaying video and/or graphics. It should be appreciated that optional display device 1012 can be a cathode ray tube (CRT), flat panel liquid crystal display (LCD), field emission display (FED), plasma display or any other display device suitable for displaying video and/or graphic images and alphanumeric characters recognizable to a user.

The components associated with system 1000 described above may be resident to and associated with one physical computing device. However, one or more of the components associated with system 1000 may be physically distributed to other locations and be communicatively coupled together (e.g., via a network).

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system comprising:
a processor configured to execute the following computer executable components:
a hash component configured for hashing a request indication into a hash value;
a queue request order component configured for tracking a queue request order, wherein an index of said queue request order component corresponds to said hash value and is used to determine a count value associated with said hash value;
wherein said queue request order component comprises:
an incrementor configured for incrementing said count value when said request associated with said hash value is received from the said hash component; and a decrementor that configured for decrementing said count value when an indication is received indicating the said request associated with said hash value is issued by said request queue component;
a plurality of registers configured for storing said count value;
a count adjustment component configured for adjusting said count value;
a request queue component configured for issuing a request associated with said hash value in accordance with count value without stalling a request queuing process associated with the system, wherein said count value is determined based at least on a number of requests associated with said hash value that are issued by said request queue component; and
wherein said queue request order component further comprises:
an input multiplexer configured for receiving request inputs and selecting between said request inputs, wherein inputs of said plurality of registers are coupled to respective outputs of said input multiplexer; and
an output multiplexer configured for receiving outputs from
said request inputs and selecting between said request inputs.

2. The system of claim 1, wherein said request indication corresponds to a storage address.

3. The system of claim 1, wherein said request queue component is further configured for queuing requests based upon said count value received from said queue request order component.

4. The system of claim 1, wherein said request queue component is further configured for forwarding an indication to said queue request order component when said request is processed by said request queue component.

5. A method comprising:
performing an address indication compression process that compresses the address indication;
performing, using at least one processor, a queue request order tracking process based on a count value associated with a hash of the address indication, wherein the count value corresponds to a count of received requests associated with the hash minus another count of issued requests associated with said hash, and a queue request order component tracks said count value using a table indexed based on said hash;
performing a request queuing process in accordance with said queue request order tracking process, wherein said queue request order tracking process maintains a queue request order without stalling said request queuing process even when an aliasing request occurs; wherein said queue request order tracking process comprises counting number of requests associated with a hashed address; and,
wherein said queue request order tracking process comprises incrementing said count value when a request associated with said hash is received.

6. The method of claim 5, wherein said address indication compression process comprises hashing a received address.

7. The method of claim 5, wherein said queue request order tracking process comprises forming a request order table.

8. The method of claim 5, wherein said queue request order tracking process comprises decrementing said count value when an indication is received that indicates said request queuing process has processed a request associated with said hash.

9. The method of claim 5, wherein said request queuing process comprises forwarding an indication to said queue request order tracking process that said request queuing process has processed a request associated with said hash.

10. A system comprising;
a processing component configured for processing information;
a storage component configured for storing said information for said processing component, wherein said storage component is responsive to requests from said processing component to read and write said information, wherein said storage component maintains a queue request order and a request count using a table indexed using based on a hash without stalling requests in aliasing conditions, and said request count is determined based at least on a number of requests associated with said hash that are issued by said processing component;
a bus configured for communicating said information between said processing component and said storage component;
wherein said storage component utilizes hashes of said requests to track a queue request order, wherein said hashes correspond to indexes of a queue request order component and a request queue component, and the request queue component forwards requests in accordance with direction from said queue request order component;
a plurality registers configured for storing said request count;
a count adjustment component configured for adjusting said request count; and
wherein said request count is incremented for a received request associated with said hash, and
said request count is decremented for an issued request associated with said hash.

11. The system of claim 10, wherein said storage component is included in a processor chip.

12. The system of claim 10, wherein said storage component comprises:
a schedule tracking component configured for tracking a schedule for handling a request; and
a buffer component configured for storing requests and forwarding said requests in accordance with said schedule.

* * * * *